United States Patent Office

3,701,805
Patented Oct. 31, 1972

3,701,805
PREPARATION OF CITRACONIC AND
ITACONIC ACIDS
Rudolph G. Berg, Groton, Conn., assignor to Pfizer Inc.,
New York, N.Y.
No Drawing. Filed Sept. 27, 1971, Ser. No. 184,260
Int. Cl. C07c 51/38
U.S. Cl. 260—531 R     4 Claims

ABSTRACT OF THE DISCLOSURE

High purity citraconic or itaconic acid can be prepared by a two step process using citric acid, isocitric acid, isocitric lactone, aconitic acid, their anhydrides or mixtures thereof as the starting reactant. The first step is a vapor-phase catalytic conversion of the starting reactant in admixture with an inert gas at about 215–400° C. to citraconic acid or anhydride from which citraconic acid can be recovered. The second step involves isomerization of the aqueous citraconic acid solution obtained to yield itaconic acid. The catalytic material employed in the first step comprises a supported alkali or alkaline earth metal salt of phosphoric acid, pyrophosphoric acid, boric acid, or sulfuric acid. The concentration of active catalyst material on the inert support is preferably about 0.1–5 weight percent for alkali metal dihydrogen phosphates. Potassium dihydrogen phosphate is most preferred as the active catalyst material. The second step isomerization is preferably carried out at 180–250° C. at an initial concentration of citraconic acid of 35–50 weight percent.

BACKGROUND OF THE INVENTION

Itaconic acid, a valuable raw material for synthetic resins, can be prepared by fermentation procedures, or by pyrolysis of citric acid with or without a catalyst to yield citraconic acid or anhydride followed by isomerization of the resulting aqueous citraconic acid solution to yield itaconic acid (see for example Askew and Tawn, J. Soc. Chem. Ind., 69, pp. 97–99 (1950); Beppu et al., J. Gen. Applied Microbiology, 3, No. 4, pp. 225–232 (1957); and Linstead and Mann, J. Chem. Soc. 1931, pp. 726–40). However, the prior art methods usually teach operating the pyrolysis step at reduced pressures in the liquid phase, resulting in a citraconic acid product containing undesirable residue-forming side products. Side-product buildup in the reaction bath resulting in decreasing yields with time, necessitate batch method operation to allow periodic removal of such residue from the reaction bath. Also, the prior art teaches isomerizing (e.g. for 8 hours at 160° C.) citraconic acid solutions having low initial concentrations (e.g. 10–25 weight percent) and providing yields of itaconic acid of about 40–50% theoretical. Such isomerization solutions contain impurities requiring purification before isolation of the itaconic acid.

In contrast, by conducting the pyrolysis step with a diluent gas in the vapor-phase using a fixed-bed catalyst of the type to be disclosed, employing a relatively short contact time and higher temperatures than previously disclosed, citraconic acid or anhydride is obtained in good yield (e.g. 80–95%) and relatively free of undesirable side products. Furthermore, the problem of buildup of residue in the catalyst system is substantially eliminated. The citraconic acid solutions obtained from the pyrolysis can be directly utilized, preferably after concentrating, for isomerization to itaconic acid in good yield (e.g. 85% of theoretical). The itaconic acid can be recovered directly by crystallization techniques. The isomerization is accomplished in relatively short time at higher temperatures than taught by the prior art, thus substantially reducing the buildup of undesirable side products (e.g. citramalic, paraconic, and mesaconic acids). Consequently, the present process is operable on a continuous, as well as batch basis.

SUMMARY OF THE INVENTION

A process for the preparation of itaconic acid which comprises:

(a) Forming a spray mist mixture comprising finely dispersed particles of a reactant in an inert diluent gas, said reactant being at least one member selected from the group consisting of citric acid, isocitric acid, isocitric lactone, aconitic acid, and their anhydrides;

(b) Contacting said mixture at about 215° C. for 20 seconds to 400° C. for 0.05 second with an inert support material containing about 0.01–20 weight percent of active catalyst material based on the total weight of support and catalyst material, said active catalyst material being at least one member selected from the group consisting of metal salts of phosphoric acid, pyrophosphoric acid, boric acid, and sulfuric acid, wherein said metal is alkali or alkaline earth, whereby a gaseous product comprising citraconic acid and anhydride is formed;

(c) Absorbing the gaseous product of (b) in water to form an aqueous solution comprising citraconic acid;

(d) Isomerizing the citraconic acid and recovering the itaconic acid produced thereby.

Preferably in (d) the isomerization comprises heating and maintaining said aqueous citraconic acid solution at about 180° C. for 1.5 hours to 250° C. for 20 seconds, said citraconic acid solution having an initial concentration of about 35–50 weight percent.

Preferably in (b) an active catalyst material is selected from alkali metal dihydrogen phosphates and represents about 0.1–5 weight percent of the total support and catalyst weight. Most preferably, said active catalyst material is potassium dihydrogen phosphate, and the contact of said mixture by said catalyst on said support material takes place at about 260° C. for 5 seconds to 350° C. for 0.2 second.

Also contemplated within the scope of the invention is a process for preparing citraconic acid which comprises following steps (a)–(c) described above, and recovering the citraconic acid produced thereby.

DETAILED DESCRIPTION OF THE INVENTION

The reactants which can be used in the pyrolysis step to produce citraconic acid are not limited to but include citric acid, isocitric acid, isocitric lactone, aconitic acid, their anhydrides and mixtures thereof. These reactants are not very volatile and tend to decompose at or near their respective melting points to yield undesirable side products. Such side products contribute to residue buildup that reduces the effectiveness of the catalyst and results in low yields of impure product. Therefore, it is highly desirable as disclosed by the present invention to pyrolyze the reactants in the vapor phase in a very short time to efficiently convert them to the citraconic acid or anhydride product, which is then absorbed or scrubbed by water to yield a citraconic acid solution.

A spray mist mixture containing inert diluent and reactant can be formed conveniently by passing an inert diluent gas (pre-heated above the reaction temperature) through an aspirator to mix with a fine mist of aqueous reactant produced by the aspiration. This mixture almost instantaneously becomes vaporized upon entering the reactor due to the combined effect of heating from the inert diluent gas and the reaction chamber and contact with the catalyst. Not being critical, any gas which is inert to the reaction products or starting material, including substances such as nitrogen, helium, carbon dioxide, superheated steam or recycled reactor effluent gases after removal of the low volatility reaction products, could be employed for the diluent gas feed portion of the system. Also, the spray mist mixture may comprise an inert diluent gas containing reactant, finely dispersed therein as solution or liquid droplets, solid particles, or mixtures thereof.

The procedure of heating the inlet inert diluent gas though not necessary for the present process is found preferable to that of heating the reaction mixture by externally heating the reactor and catalyst bed. The preferred process enables almost instantaneous heating to the optimum reaction temperature thereby minimizing residue forming reactions which occur at lower teperatures. Residue formation is preferably minimized to avoid fouling of the catalyst bed. Typically, the inert diluent gas is fed to the aspirator portion of the reactor inlet system preheated to about 480–500° C. Under the flow conditions employed, such preheating provides sufficient latent heat to evaporate the water of the reactant feed solution and heat the less volatile remainder to the desired reaction temperature (e.g. about 280–320° C.). Additional inert sweeping gas by-passing the aspirator is smilarly preheated to the desired reaction temperature, or higher if needed for additional heating of the vapors or to increase the rate of flow of the vapors if desired. In this manner the only external heat required to maintain the catalyst bed at the desired reaction temperature is that required to compensate for heat loss to surroundings or small additional amounts to compensate for minor imbalances in the system.

The inert support material containing active catalyst material is prepared by techniques well known in the art and will be further typified in the subsequent examples. The surface area of the inert support material is not critical, but it has been found that satisfactory results are obtained where the surface area is 10–50 square meters/gram.

Preferably, the concentration of active catalyst material is from about 0.01–20 weight percent, based on the total weight of support plus catalyst material; however, best results are obtained where the concentration is about 0.1–5 weight percent.

The active catalyst material can be selected from any of the broad class of alkali and alkaline earth metal salts of phosphoric acid, pyrophosphoric acid, boric acid, and sulfuric acid. Typical active catalyst materials include potassium pyrophosphate, lithium borate, lithium sulfate, sodium phosphate, sodium pyrophosphate, strontium borate, calcium borate, barium sulfate, barium phosphate and magnesium sulfate. Also contemplated by the present invention are combinations of the above acid metal salts. Good results are obtained using alkali metal salts of the above-mentioned acids. Preferably, potassium dihydrogen phosphate is used.

Although the shape of the reactor is not critical, the reaction is conveniently carried out in a tubular reactor packed with the catalyst and support. In this case, the catalyst bed diameter to length ratio can be from about 4:1 to 1:100, and is preferably about 1:4.

Very brief contact times between gaseous reactants and the catalyst material are desired to prevent undesirable side-products and residue from forming which would limit the life of the catalyst and give reduced yields of citraconic acid and/or anhydride. The contact time is of course dependent on the reaction temperature at which the pyrolysis step is carried out. Preferably, the contact time is from about 20 seconds at 215° C. to 0.05 second at 400° C., resulting in good yields (e.g. 76–93%) of citraconic acid. Most preferably the contact time is from about 5 seconds at 260° C. to 0.2 second at 350° C.

The desired citraconic acid/anhydride product in the gaseous effluent from the reactor can be typically recovered using either a series of cold traps, the last of which is filled with glass wool and is cooled with Dry Ice mixture, or a scrubber using water or some other suitable absorption liquid. Alternatively, the effluent could be sampled continuously via a heated transfer line connected to a heated gas sampling valve of a vapor chromatograph. Such a system enables repeated and rapid analysis of the product mixture. Acidic products obtained from the reaction are preferably analyzed by vapor chromatography after derivatization as trimethylsilyl esters. Actual isolation of citraconic acid/anhydride could be accomplished by the usual techniques employed for this substance including azeotropic drying to the anhydride followed by distillation. The crude aqueous product as obtained, however, is usually clean enough to be employed in many applications without further purification. Thus, the citraconic scrub liquors typically obtained could be isomerized to give high quality crystalline itaconic acid, by the methods to be herein disclosed.

As discussed above, the citraconic acid solution obtained from the reactor effluent gases is relatively free of contaminants and can be used directly for isomerization to itaconic acid. Again to prevent the formation of substantial amounts of side-products (e.g. citramalic, paraconic, and mesaconic acids) during isomerization, the isomerization reaction is conducted under conditions of higher temperatures and shorter reaction times than those disclosed in the prior art. The high temperature conditions shift the relative rates of formation of itaconic acid versus by-products in favor of itaconic acid. Such favorable shift is a critical requirement because the desirable high reactant concentration of the present invention would, under the conditions of the prior art, give rise to excessive by-product formation. Likewise, the reaction time of the present process is critical because the ratio of itaconic acid to by-products is much more favorable at short reaction times than at times sufficiently long to establish dynamic equilibrium. A requirement of the present invention, therefore, is to terminate the reaction at optimum levels of itaconic formation before appreciable by-product accumulation has been allowed to occur. Thus, good results (e.g. about 80% itaconic acid which is substantially pure) are obtained by isomerizing the citraconic acid solution at from about 180° C. for 1.5 hours to 250° C. for 20 seconds; optimum results can be achieved from about 190° C. for 40 minutes to 230° C. for 1 minute.

Also, it is preferable to use a citraconic acid solution in the isomerization step having an initial concentration of citraconic acid of about 35–50 weight percent; although using a solution having an initial concentration of about 25–75 weight percent is also operable. This can easily be done by concentrating the resulting citraconic acid solution before isomerization.

In practice, the isomerization reaction is preferably terminated by rapidly cooling the reaction mixture down to at least about 150° C. (e.g. within about 5 minutes) and then more slowly to room temperature. The itaconic acid can be recovered directly from the reaction mixture by techniques well known in the art. Conveniently this is done by crystallization, filtration, washing, and drying.

Since the above reaction steps involve much less time than did the prior art and because relatively pure products are obtained while at the same time reaction streams are more highly concentrated, the process steps can be carried out continuously or in combination, and the total process is not limited to batch procedures as the prior art discloses. Thus, part of the effluent gases from the pyrolysis step can be continuously recycled to the reactor to improve the efficiency of conversion to citraconic acid and/or anhydride. Also, part of the itaconic acid solution product obtained from the isomerization step can be continuously recycled to the initial citraconic acid solution for isomerization once more, and/or part of the itaconic acid crystallization filtrate solution can be recycled to the pyrolysis step to make up part of the initial reactant for pyrolysis.

The following examples are provided for illustrative purposes and should not be interpreted as limiting the invention, the scope of which is defined by the appended claims.

EXAMPLE I

A catalyst was prepared by extracting an Alundum support, such as Norton Products No. LA3032, 1/8 x 1/8" pellets, 35–40 m.²/gm. surface, with constant boiling hydrochloric acid in a continuous extractor for 18 hours. The pellets were then washed with deionized water until an acidic reaction could no longer be detected and then air-dried on a steam bath to constant weight. One hundred grams of the resulting dried pellets were treated with a solution of 10 gm. potassium dihydrogen phosphate in 190 cc. of water. The pellets were soaked in this solution for 1/2 hour, filtered to remove excess liquor and, finally, dried to constant weight in a vacuum oven at 70° C. The resulting dried pellets contained about 3.2% potassium dihydrogen phosphate.

A short 1 1/8" I.D. stainless steel tube was fitted with a gas and a liquid inlet tube. The end of the gas inlet tube was restricted so as to provide a 10 p.s.i.g. back pressure under normal operating conditions. Both tubes were juxtaposed so as to cause any liquid fed to the system to aspirate as a uniform fine mist. A third inlet tube was placed above the first two so that an additional gas could be provided to the chamber in a relatively non-turbulent manner thus helping to sweep the mist from the liquid feed smoothly through the system. The first two tubes were installed in a separate manner rather than as a concentric unit so as to minimize heat transfer between the gas and the liquid feed. Such construction, though not essential, proved useful for maintaining a uniform, pulseless feed.

The tubular reactor was filled with the above potassium dihydrogen phosphate catalyst so as to provide a bed 4.5" long. The top of this bed was positioned within 1/4 to 1/2" of the liquid feed tube. Close proximity of the catalyst bed to the feed tube minimizes the time during which the divided liquid stream is in free flight without being in contact with the catalyst. Minimizing free flight time was found to be preferable since undesirable residue forming side reactions apparently become a significant factor in the total process in the absence of contact with the catalyst bed.

Referring to the apparatus above described, a 58% wt./wt. solution of isocitric acid in water was metered to the inlet system at a rate of 0.494 gm. solution/min. for a total of 65 min. Nitrogen gas preheated to 480±5° C. was fed to the aspirator inlet at such a rate as to result in 10 lbs. back pressure. The nitrogen flow rate observed using a rotometer calibrated at room temperature was 10.4 ft.³/hr. at STP conditions. This rate calculates as 16.1 standard cubic feet per hour (s.c.f.h.). A relatively negligible amount of nitrogen sweep gas preheated to 320±5° C. was also admitted to the system. The temperature of the catalyst bed was held between 290 and 340° by minor adjustments of external heat supplied by electrical resistant heaters.

Exactly at what point in this process the relatively nonvolatile isocitric acid feed mist becomes transformed into a vapor was not determined. The catalyst bed, however, did not become wet at any time in the reaction. The superficial contact time of the vapors in the catalyst bed, as calculated by volume displacement, was 0.9 second. The product was collected in a series of traps as described previously.

At the end of the run the contents of the traps were transferred into a common receptacle using acetone washes. The resulting solution was heated briefly to transform all anhydrides to their free acids and then concentrated at about 40° C. under reduced pressure. The concentrate weighed 14.0 grams. The concentrate was analyzed for citraconic and itaconic acid as follows: The total product was dissolved in about 50 ml. water, warmed 5 minutes on a steam bath, allowed to cool, transferred to 100 ml. volumetric flask and diluted to volume with water. A 1.0 ml. sample of this first solution was further filuted to 10.0 ml. with tetrahydrofuran (THF). 2.0 ml. of the second dilution was then transferred to a 6 ml. septum bottle and eveaporated to dryness using a stream of dry nitrogen at ambient temperature. 2.0 ml. dimethoxypropane (DMP) was then added and the drying procedure repeated avoiding prolonged exposure to the DMP. Prolonged exposure to DMP was found to cause reformation of anhydride which results in an erroneously low assay. When the second drying was completed 3.0 ml. fresh anhydrous THF was added, the bottle was temporarily closed with a Hycar septum, and the mixture occasionally shaken during 5 minutes to insure homogeneous solution. Finally, 1.0 ml. N,O-bis-(trimethylsilyl)-acetamide (BSA) was added and the bottle permanently sealed with the Hycar septum. After standing 10 minutes at room temperature, the sample was analyzed using a vapor fractometer fitted with a column containing 8% OV–17 on NAW Chromosorb W. Quantitative comparison with similarly derived pure citraconic and itaconic acid trimethylsilyl standards provided information necessary for yield calculations. According to this assay, the product contained 10.8 grams citraconic acid and less than 0.5 gram itaconic acid representing a theoretical yield of 85.5% citraconic acid along with less than 0.5% itaconic acid. Similar results are obtained using isocitric acid anhydride instead of isocitric acid and contacting the catalyst bed with the feed gases at about 400° C. for 0.05 second.

EXAMPLE II

The procedure of Example I is followed except substituting citric acid for isocitric acid. An 82% theoretical yield of citraconic acid was obtained. The amount of itaconic acid was negligible. Similar results are obtained by contacting the catalyst bed with the feed gases at about 215° C. for 20 seconds.

EXAMPLE III

A reaction identical to that given in Example II was run except that the systems of traps was replaced with a 1 ft. long glass tube, of 3/4" I.D. packed with glass helixes. Cold water was slowly fed to the top of the tube while the effluent gas from the reactor was fed to the bottom. Arrangement was provided to allow the liquors containing the dissolved reaction products to drain from the bottom of the scrubber and be collected while the exhausted gases were bled from the top. At the end of the run the collected liquors were analyzed and found to contain similar amounts of citraconic acid as had been obtained using the trapping system of Example II.

EXAMPLE IV

A continuous pyrolysis was run for 30 hours following the procedure of Example I. The effluent was sampled at the beginning, again after 6 hours, and again just before the completion of the run. Analyses of the samples disclosed that within experimental error similar yields were obtained during each of the sampling periods.

At the conclusion of the run, the reactor was disassembled to enable inspection of the catalyst. The catalyst, which initially appeared nearby white, was observed to be a light to medium gray in color. No other evidence of residue build-up was observed.

The reactor containing the gray colored catalyst was again assembled and heated to 500° C. while passing air through for 1 hour. Upon subsequent examination, the catalyst was observed to have returned to its originally nearly white color. A subsequent run using this regenerated catalyst and starting with citric acid provided citraconic acid in a yield substantially the same as that achieved with the catalyst when it was first charged to the reactor.

EXAMPLE V

Following the procedure of Example I a solution of aconitic acid in hot water is fed continuously to the reactor resulting in an 85% yield of citraconic acid.

EXAMPLE VI

Following the procedure of Example I a solution of isocitric lactone anhydride in acetone is fed continuously to the reactor. Citraconic acid anhydride is observed in the effluent from the reactor. Similar results are obtained using isocitric lactone instead of the anhydride.

EXAMPLE VII

Following the procedure of Example I a solution of itaconic acid in hot water was fed to the continuous pyrolysis unit and an 85% yield of citraconic acid was obtained.

EXAMPLE VIII

The procedure of Example II was repeated except that gas flow rates were increased to provide a contact time of 0.1 sec. and heating conditions were adjusted to give a reaction temperature of 240–250° within the catalyst bed. Analysis of the product disclosed citraconic acid and itaconic acid yields of 41% and 14% of theoretical.

EXAMPLE IX

The procedure of Example VIII was repeated except that a shorter catalyst bed was employed. The product obtained was analyzed and found to consist of a larger quantity of itaconic acid and a reduced quantity of citraconic acid.

EXAMPLE X

The supported potassium dihydrogen phosphate catalyst described in Example I was crushed and screened to provide a 40–60 mesh fraction. This material was used for packing a clean stainless steel injector insert from a gas chromatograph. The catalyst bed was held in place with small Pyrex wool plugs at either end. The insert was then installed with a gas chromatograph fitted with the analytical column described in Example I. This arrangement provided a micro-reactor-analysis system suitable for study of pulse-type pyrolyses. Upon injecting solutions of citric acid in acetone or water in this system at an injection temperature of 260–350° (contact times of about 5 seconds to 0.2 second respectively), yields of citraconic anhydride up to 93% theory were obtained. Upon similar injections of isocitric acid or isocitric lactone, yields of isocitric anhydride up to 89% of theory were observed. Injections of isocitric lactone anhydride under similar conditions provided considerably decreased yields, but at temperatures in the range of 380–400° C. yields up to 80% of theoretical were obtained.

Examination of the catalyst bed in the microreactor after many injections of citric or isocitric acid solutions disclosed essentially no residue build up on the catalyst.

EXAMPLE XI

A pulse-type microreactor described in Example X was employed for screening the activity and selectivity of various catalysts and support materials. Best results were observed with supports with intermediate surface areas (10–45 meter$^2$/gm.) although at least some citraconic anhydride was obtained with all supports tested. Likewise best results were obtained with alkali metal dihydrogen phosphate catalysts with potassium dihydrogen phosphate being preferred because of an optimum balance between product yield and catalyst cost. The preferred concentration of active catalyst material in the support ranged between 0.1 to 5.0% by weight although concentrations from about 0.01–20% by weight also proved operable. Alkaline earth phosphates also proved suitable. Many other acidic salts derived from alkalies and alkaline earths and acids such as sulfuric or boric also provided citraconic anhydride although evidence of residue formation was frequently noticed when these catalysts were used. Similar results are obtained using supports containing more than one active catalyst material.

EXAMPLE XII 65 grams of a 42% wt./wt. aqueous solution of citraconic acid was placed in a 95 ml. Monel sampling cylinder such as Hoke No. 4HDM 95. The remaining air was then displaced with nitrogen and the cylinder was sealed. The cylinder was completely immersed in a stirred silicone oil bath maintained at 200° C. for 20 minutes. The cylinder was then rapidly cooled to 150° and then more slowly to about 50° and the contents removed. This experiment was repeated 3 additional times starting with an equivalent amount of fresh citraconic acid solution each time.

The products of these four experiments were combined and concentrated to 70% wt./wt. solids. The concentrate was allowed to cool and a major portion of the itaconic acid dissolved therein crystallized. The mixture was then further cooled to about 5° C. for about 2 hours and the crystals which had precipitated were filtered using a small amount of fresh ice water for transfers and cake washes. The cake, dried to constant weight at 50° C. in a vacuum oven, weighed 54.6 gm. The product melted at 164–166° and proved identical to an authentic sample of itaconic acid as demonstrated by thin layer chromatography and IR and NMR absorption spectra.

The filtrates and washes from the above runs were combined and diluted to 130 cc. with fresh water. One-half of the resulting solution was charged to each of two runs, otherwise conducted in identical manner to those above. Again the products were combined, concentrated, allowed to crystallize, filtered, washed, and dried as before giving 22.8 gm. additional itaconic acid.

Finally, the filtrates of the above recycle runs were combined, adjusted to 65 ml. with water and again recycled in one run identical to those above and 7.2 gm. additional itaconic acid was obtained. Further concentration provided 0.7 gm. second crop itaconic acid. The total weight of all itaconic crops collected equaled 85.3 g. representing 78% of the theoretical yield available. Similar results are obtained using a silicine oil bath maintained at about 180° C. and immersing the sampling cylinder containing a 50 weight percent aqueous citraconic acid solution for about 1.5 hours.

EXAMPLE XIII

The final filtrate from Example XII was examined by thin layer chromatography and was found to contain a mixture of mesaconic, itaconic, citraconic, paraconic and citramalic acids. This mixture was diluted to 58% wt./wt. solids content with water and passed through the pyrolysis unit as described in Example I. Examination of the effluent from the reactor disclosed 19 gm. citraconic acid or approximately 80% of the citraconic acid charged to the isomerization reaction Example XII that had not been converted to and recovered as itaconic acid.

EXAMPLE XIV

A tantalum-clad, continuous-flow, isomerization reactor fitted with a pulse-free high pressure liquid pump and a variable-flow, constant-pressure control on the exit with heat exchangers to allow very rapid heating of the inlet liquid and cooling of the exit liquors was assembled. The reactor provided for partial concentration of the effluent liquors, continuous filtration of the crystalline product obtained and partial recycling of the filtrate to the feed liquors for the reactor. A 42% wt./wt. aqueous solution of citraconic acid was fed to the reactor in such a manner as to enable rapid heating to 220° C., holding at this temperature for 3 minutes, rapid cooling to 150° C., concentration to 70% wt./wt., cooling to 5° C., filtration including a small ice-water wash and 75% recycle of the filtrate to the feed. The itaconic acid recovered, represented 82% of the citraconic acid charged. Similar results are obtained wherein a 35 weight percent aqueous citraconic acid solution is rapidly heated to about 250° C. for 20 seconds, and thereafter similarly cooled and processed.

EXAMPLE XV

The scrub liquor obtained from Example III was concentrated to 42% wt./wt. solids and then charged to the continuous isomerization reactor and processed following the procedure described in Example XIV. A 76% yield of itaconic acid based on citraconic acid charged was obtained.

EXAMPLE XVI

Similar results are obtained following the procedure of Example I using the following inert support materials made by the Norton Company in place of the Alundum support:

SiC—trade name is Crystolon
$Zr(SiO_2)_2$—trade name is Zircon
$ZrO_2$—trade name is Zirconia
70 wt. percent $Al_2O_3$ and 29 wt. percent $SiO_2$—trade name is Mullite

What is claimed is:
1. A process for the preparation of itaconic acid which comprises:
   (a) forming a spray mist mixture comprising finely dispersed particles of a reactant in an inert diluent gas, said reactant being at least one member selected from the group consisting of citric acid, isocitric acid, isocitric lactone, aconitic acid, and their anhydrides;
   (b) contacting said mixture at about 215° C. for 20 seconds to 400° C. for 0.05 second with an inert support material containing about 0.01–20 weight percent of active catalyst material based on the total weight of support and catalyst material, said active catalyst material being at least one member selected from the group consisting of metal salts of phosphoric acid, pyrophosphoric acid, boric acid, and sulfuric acid, wherein said metal is alkali or alkaline earth, whereby a gaseous product comprising citraconic acid and anhydride is formed;
   (c) absorbing the gas product of (b) in water to form an aqueous solution comprising citraconic acid;
   (d) isomerizing the citraconic acid by heating and maintaining said aqueous citraconic acid solution at about 180° C. for 1.5 hours to 250° C. for 20 seconds, said citraconic acid solution having an initial concentration of citraconic acid of about 35–50 weight percent, and recovering the itaconic acid produced thereby.
2. The process of claim 1 wherein the concentration of said active catalyst material obtained by the inert support is about 0.1–5 weight percent based on the total weight, and said active catalyst material is an alkali metal dihydrogen phosphate.
3. The process of claim 2 wherein said active catalyst material is potassium dihydrogen phosphate, and in (b) the contacting of said mixture by said catalyst contained on said support material takes place at about 260° C. for 5 seconds to 350° C. for 0.2 second.
4. A process for the preparation of citraconic acid which comprises:
   (a) forming a spray mist mixture comprising finely dispersed particles of a reactant in an inert diluent gas, said reactant being at least one member selected from the group consisting of citric acid, isocitric acid, isocitric lactone, aconitric acid, and their anhydrides;
   (b) contacting said mixture at about 215° C. for 20 seconds to 400° C. for 0.05 second with an inert support material containing about 0.01–20 weight percent of active catalyst material based on the total weight of support and catalyst material, said active catalyst material being at least one member selected from the group consisting of metal salts of phosphoric acid, pyrophosphoric acid, boric acid, and sulfuric acid, wherein said metal is alkali or alkaline earth, whereby a gaseous product comprising citraconic acid and anhydride is formed;
   (c) absorbing the gaseous product of (b) in water to form an aqueous solution comprising citraconic acid and recovering the citraconic acid produced thereby.

References Cited

UNITED STATES PATENTS 2,448,506    9/1948    Ambler _____ 260—537 N

OTHER REFERENCES

Askew et al., J. Soc. Chem. Ind., 69, pp. 97–99 (1950).
Beppu et al., J. Gen. Applied Microbiology, 3, No. 4, pp. 225–237 (1957).
Linstead et al., J. Chem. Soc., 1931, pp. 726–40.

VIVIAN GARNER, Primary Examiner

U.S. Cl. X.R.

252—416; 260—343.6, 346.8, 535 P, 537 N